(12) United States Patent  (10) Patent No.: US 9,007,513 B2
Sakurai  (45) Date of Patent: Apr. 14, 2015

(54) IMAGING DEVICE AND METHOD OF CONTROLLING THE SAME

(71) Applicant: Seiko Epson Corporation, Tokyo (JP)

(72) Inventor: Shinji Sakurai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 175 days.

(21) Appl. No.: 13/831,941

(22) Filed: Mar. 15, 2013

(65) Prior Publication Data

US 2013/0250163 A1 Sep. 26, 2013

(30) Foreign Application Priority Data

Mar. 26, 2012 (JP) ................................. 2012-069216

(51) Int. Cl.
 *H04N 5/232* (2006.01)

(52) U.S. Cl.
 CPC ................................. *H04N 5/23212* (2013.01)

(58) Field of Classification Search
 CPC ................................................ H04N 5/23212
 USPC ................. 348/204.99, 240.3, 345, 347, 349, 348/353–356
 See application file for complete search history.

(56) References Cited

U.S. PATENT DOCUMENTS

| | | | | |
|---|---|---|---|---|
| 5,185,669 A | * | 2/1993 | Kato | 348/223.1 |
| 5,218,444 A | * | 6/1993 | Mizutani et al. | 348/347 |
| 5,543,840 A | * | 8/1996 | Hirota | 348/345 |
| 5,764,290 A | * | 6/1998 | Hirota et al. | 348/240.3 |
| 5,815,203 A | * | 9/1998 | Lee et al. | 348/240.3 |
| 7,885,529 B2 | * | 2/2011 | Honjo et al. | 396/133 |
| 2009/0009631 A1 | * | 1/2009 | Hoshi | 348/231.99 |
| 2012/0063759 A1 | * | 3/2012 | Iwasaki | 396/82 |
| 2013/0250163 A1 | * | 9/2013 | Sakurai | 348/347 |

FOREIGN PATENT DOCUMENTS

JP 2010-171761 A 8/2010

* cited by examiner

*Primary Examiner* — Aung S Moe

(74) *Attorney, Agent, or Firm* — ALG Intellectual Property, LLC

(57) ABSTRACT

A document camera has an automatic focus function, and performs the automatic focus process for automatically adjusting the focus lens to the focal position in accordance with the subject distance when the document camera is started up, or when the focus key of the input operation section is operated. Further, when performing the automatic focus process, the document camera is arranged to detect the focal position in the state in which the zoom lens is temporarily moved to the telephoto end with shallow depth of field, and then restore the position of the zoom lens to the original position.

15 Claims, 5 Drawing Sheets

| Z \ D | ∞ | ... | 5m | ... | 1m | ... | 30cm | ... | 5cm |
|---|---|---|---|---|---|---|---|---|---|
| 1 | a1 | ... | b1 | ... | c1 | ... | d1 | ... | e1 |
| 2 | a2 | ... | b2 | ... | c2 | ... | d2 | ... | e2 |
| 3 | a3 | ... | b3 | ... | c3 | ... | d3 | ... | e3 |
| 4 | a4 | ... | b4 | ... | c4 | ... | d4 | ... | e4 |
| ⋮ | ⋮ | ... | ⋮ | ... | ⋮ | ... | ⋮ | ... | ⋮ |
| 12 | a12 | ... | b12 | ... | c12 | ... | d12 | ... | e12 |

IMAGING DEVICE AND METHOD OF CONTROLLING THE SAME

BACKGROUND

1. Technical Field

The present invention relates to an imaging device for taking an image of an object and a method of controlling the imaging device.

2. Related Art

There have been known an imaging device (e.g., a document camera) for taking an image of a manuscript, a variety of types of materials, and so on placed on a desk and so on as an object, and outputting the image information to an image display device such as a projector, and a personal computer (see, e.g., JP-A-2010-171761 (Document 1)). The document camera described in Document is provided with an automatic focus function for automatically adjusting the focus, and at the same time a zoom function for controlling the magnification ratio of the imaging. In general, as the automatic focus function of the document camera, there is adopted a contrast detection method, which has a simple structure and can be miniaturized. In the contrast detection method, the image of the object is taken to detect the contrast while changing the focus, and the state with the highest contrast is determined as a focused state.

However, in the case of performing the automatic focus process based on the image thus taken as in the case of the contrast detection method, there is a problem that defocus easily occurs when the automatic focus process is performed on the wide-angle side of a zoom function realized by an optical zoom mechanism, and then the shift to the telephoto side is performed. This is because, on the wide-angle side, significant difference in imaging result (the contrast detected and so on) is difficult to occur if the focus is varied in the automatic focus process due to deep depth of field, and it is difficult to perform precise determination on focal state, while on the telephoto side, slight defocus on the wide-angle side appears as significant defocus due to shallow depth of field.

SUMMARY

An advantage of some aspects of the invention is to solve at least a part of the problems described above, and the invention can be implemented as one of the following forms or application examples.

Application Example 1

This application example is directed to an imaging device including a lens unit including a zoom lens and a focus lens, an imaging element adapted to receive light input through the lens unit to perform imaging, a zoom drive section adapted to move the zoom lens in an optical axis direction to vary a focal distance, a focus drive section adapted to move the focus lens in the optical axis direction to vary a focus state, and a focus control section adapted to make the imaging element perform imaging while making the focus drive section change a position of the focus lens to detect an focal position based on an imaging result of the imaging element, and perform focusing based on the focal position detected, and the focus control section detects the focal position in a state in which the zoom lens is positioned on a telephoto side of a predetermined reference position using the zoom drive section, and then moves the zoom lens to the reference position after the detection.

According to the imaging device, the focal position is detected in the state in which the position of the zoom lens is located on the telephoto side of the predetermined reference position, and then the zoom lens is moved to the reference position after the detection. Therefore, since the focal position is detected at the position with shallower depth of field than in the reference position, it becomes possible to detect the focal position more accurately than in the case of detecting the focal position at the reference position. As a result, even if the operation (the zoom operation) of varying the focal distance is subsequently performed, there is no need to readjust the focal position.

Application Example 2

In the imaging device according to the application example described above, it is preferable that the focus control section detects the focal position in a state in which the zoom lens is positioned at a telephoto end using the zoom drive section.

According to the imaging device of this configuration, since the focal position is detected in the state in which the position of the zoom lens is located in the telephoto end with the shallowest depth of field, it becomes possible to more accurately detect the focal position.

Application Example 3

In the imaging device according to the application example described above, it is preferable that the imaging device further includes a start-up operation section adapted to receive an operation of instructing startup of the imaging device, and the focus control section detects the focal position to perform focusing if the start-up operation section receives the operation.

According to the imaging device of this configuration, since the process for focusing is performed at startup, there is no need to separately perform the process after startup, and thus the convenience is enhanced.

Application Example 4

In the imaging device according to the application example described above, it is preferable that the reference position is a wide-angle end.

According to the imaging device of this configuration, since the process for focusing is performed at startup and then the zoom lens is moved to the wide-angle end to image a broad range, the convenience of subsequently selecting the imaging range (the range to be magnified) is enhanced.

Application Example 5

The imaging device according to the application example described above may be configured such that the focus control section detects the focal position while changing the position of the focus lens within a range smaller than a movable range of the focus lens.

According to the imaging device of this configuration, since the position of the focus lens is changed within the range smaller than the movable range of the focus lens when detecting the focal position, it becomes possible to reduce the time necessary to detect the focal position.

Application Example 6

In the imaging device according to the application example described above, it is preferable that a focus operation section adapted to receive an operation of instructing focusing is further included, the focus control section detects the focal position to perform focusing if the focus operation section receives the operation, and the reference position corresponds to the position of the zoom lens at a time point when the focus operation section receives the operation.

According to the imaging device of this configuration, if the operation of instructing focusing is received, the zoom lens is moved to the telephoto side to detect the focal position, and then the zoom lens is moved to the position at the time when the operation is received. Therefore, the zoom state (the focal distance) can be prevented from changing between before and after the process for focusing.

Application Example 7

In the imaging device according to the application example described above, it is preferable that the imaging device further includes a lens position detection section adapted to detect a position of the zoom lens, and the focus control section detects the focal position without changing the position of the zoom lens if the position of the zoom lens detected by the lens position detection section is on the telephoto side of the predetermined position.

According to the imaging device of this configuration, since the focal position is detected without changing the position of the zoom lens if the position of the zoom lens is on the telephoto side of the predetermined position, it becomes possible to reduce the time required to detect the focal position.

Application Example 8

This application example is directed to a method of controlling an imaging device including: a lens unit including a zoom lens and a focus lens, an imaging element adapted to receive light input through the lens unit to perform imaging, a zoom drive section adapted to move the zoom lens in an optical axis direction to vary a focal distance, and a focus drive section adapted to move the focus lens in the optical axis direction to vary a focus state. The method includes a zoom position changing step of positioning the zoom lens by the zoom drive section on a telephoto side of a predetermined reference position, a focus position detecting step of making the imaging element perform imaging while changing a position of the focus lens by the focus drive section, and detecting an focal position based on an imaging result of the imaging element after the zoom position changing step, a zoom position restoring step of moving the zoom lens to the reference position by the zoom drive section after the focus position detecting step, and a focusing step of performing focusing based on the focal position detected.

According to the method of controlling an imaging device, the focal position is detected in the state in which the position of the zoom lens is located on the telephoto side of the predetermined reference position, and then the zoom lens is moved to the reference position after the detection. Therefore, since the focal position is detected at the position with shallower depth of field than in the reference position, it becomes possible to detect the focal position more accurately than in the case of detecting the focal position at the reference position. As a result, even if the operation (the zoom operation) of varying the focal distance is subsequently performed, there is no need to readjust the focal position.

Application Example 9

In the method of controlling an imaging device according to the application example described above, it is preferable that in the zoom position changing step, the zoom lens is positioned in the telephoto end.

According to the method of controlling an imaging device of this configuration, since the focal position is detected in the state in which the position of the zoom lens is located in the telephoto end with the shallowest depth of field, it becomes possible to more accurately detect the focal position.

Application Example 10

In the method of controlling an imaging device according to the application example described above, it is preferable that the method further includes a startup operation step of receiving an operation of instructing startup of the imaging device, and the zoom position changing step, the focus position detecting step, the zoom position restoring step and the focusing step are performed subsequently to the startup operation step.

According to the method of controlling an imaging device of this configuration, since the process for focusing is performed at startup, there is no need to separately perform the process after startup, and thus the convenience is enhanced.

Application Example 11

In the method of controlling an imaging device according to the application example described above, it is preferable that the reference position is a wide-angle end.

According to the method of controlling an imaging device of this configuration, since the process for focusing is performed at startup and then the zoom lens is moved to the wide-angle end to image a broad range, the convenience of subsequently selecting the imaging range (the range to be magnified) is enhanced.

Application Example 12

In the method of controlling an imaging device according to the application example described above, it is possible that in the focus position detecting step, the focal position is detected while changing the position of the focus lens within a range smaller than a movable range of the focus lens.

According to the method of controlling an imaging device of this configuration, since the position of the focus lens is changed within the range smaller than the movable range of the focus lens when detecting the focal position, it becomes possible to reduce the time necessary to detect the focal position.

Application Example 13

In the method of controlling an imaging device according to the application example described above, it is preferable that the method further includes a focusing operation step of receiving an operation of instructing focusing, the zoom position changing step, the focus position detecting step, the zoom position restoring step and the focusing step are performed after the focusing operation step, and the reference position corresponds to the position of the zoom lens at a time point when the operation is received in the focusing operation step.

According to the method of controlling an imaging device of this configuration, if the operation of instructing focusing is received, the zoom lens is moved to the telephoto side to detect the focal position, and then the zoom lens is moved to the position at the time when the operation is received. Therefore, the zoom state (the focal distance) can be prevented from changing between before and after the process for focusing.

Application Example 14

In the method of controlling an imaging device according to the application example described above, it is preferable that the method further includes a lens position detecting step of detecting a position of the zoom lens, and in the focus position detecting step, the focal position is detected without changing the position of the zoom lens if the position of the zoom lens detected in the lens position detecting step is on the telephoto side of the predetermined position.

According to the method of controlling an imaging device of this configuration, since the focal position is detected without changing the position of the zoom lens if the position of the zoom lens is on the telephoto side of the predetermined position, it becomes possible to reduce the time required to detect the focal position.

Further, in the case in which the imaging device and the method of controlling an imaging device described above are configured using a computer, the aspects and the application examples of the invention described above can be configured as aspects of a program for realizing the function, or a recording medium storing the program in a computer readable manner. As the recording medium, there can be used various types of computer readable media such as a flexible disk, a hard disk, an optical disc such as CD or DVD, a magneto-optical disc, a memory card or a USB memory equipped with a non-volatile semiconductor memory device, or the internal storage device (a semiconductor memory such as a RAM or a ROM) of the imaging device.

BRIEF DESCRIPTION OF THE DRAWINGS

The invention will be described with reference to the accompanying drawings, wherein like numbers reference like elements.

DESCRIPTION OF AN EXEMPLARY EMBODIMENT

A document camera as an imaging device will hereinafter be explained with reference to the accompanying drawings. The document camera according to the present embodiment is for taking an image of a manuscript, a variety of types of materials, and so on placed on a desk and so on as an object, and then outputting the image information of the image thus taken to an external device such as an image display device or a computer.

Figure 1A:
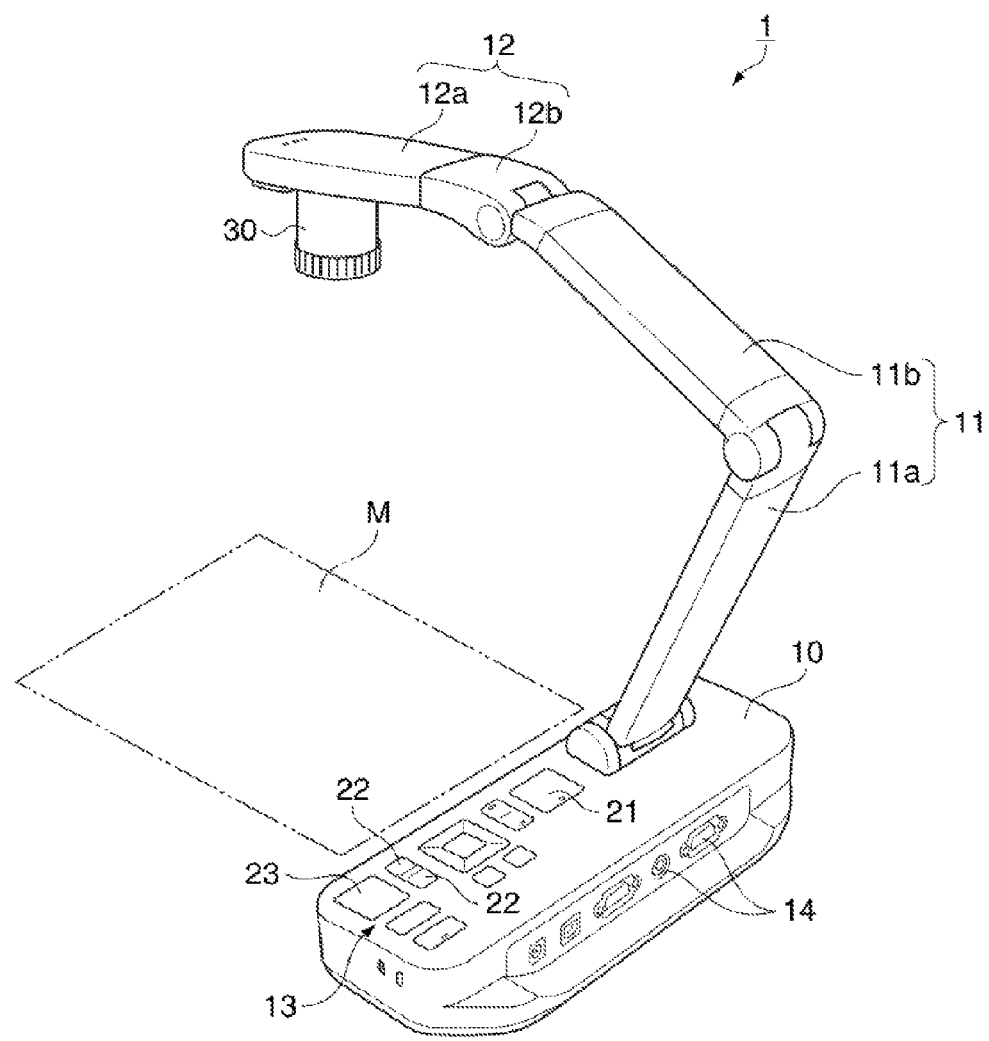
FIGS. 1A and 1B are perspective views showing a document camera.
Figure 1B:
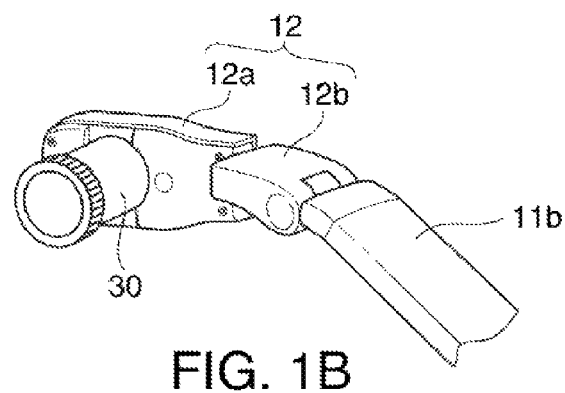

FIGS. 1A and 1B are perspective views showing the document camera according to the present embodiment. As shown in FIG. 1A, the document camera 1 is provided with a housing 10 having a box-like shape, a support arm 11, which is hollow and extends roughly upward from the housing 10, and an imaging section 12 fixed to a tip of the support arm 11. Further, on the upper surface of the housing 10, there is disposed an input operation section 13 composed of a plurality of operation keys, and on a side surface of the housing 10, there are disposed output terminals 14 for outputting image signals.

The support arm 11 is provided with a first arm 11a rotatable with respect to the housing 10, and a second arm 11b rotatable with respect to the first arm 11a, and the imaging section 12 is rotatably connected to the second arm 11b. The rotations of the first arm 11a, the second arm 11b, and the imaging section 12 are rotations having respective horizontal rotational axes parallel to each other, and by folding the support arm 11 utilizing these rotations, the user can adjust the vertical position (height) and the horizontal position of the imaging section 12. The imaging section 12 takes the image of the object M placed in the vicinity of the housing 10 from the above through a lens unit 30. Further, the document camera 1 generates the image information corresponding to the imaging result of the imaging section 12, and then outputs the image information from an output terminal 14 to an external device via a cable not shown. It should be noted that as shown in FIG. 1B, a tip portion (a main body 12a) of the imaging section 12 is arranged to be rotatable with respect to a base end section 12b connected to the second arm 11b, and the imaging section 12 is also capable of taking an image of a wall surface, an upright white board, and so on as the object M.

Figure 2:
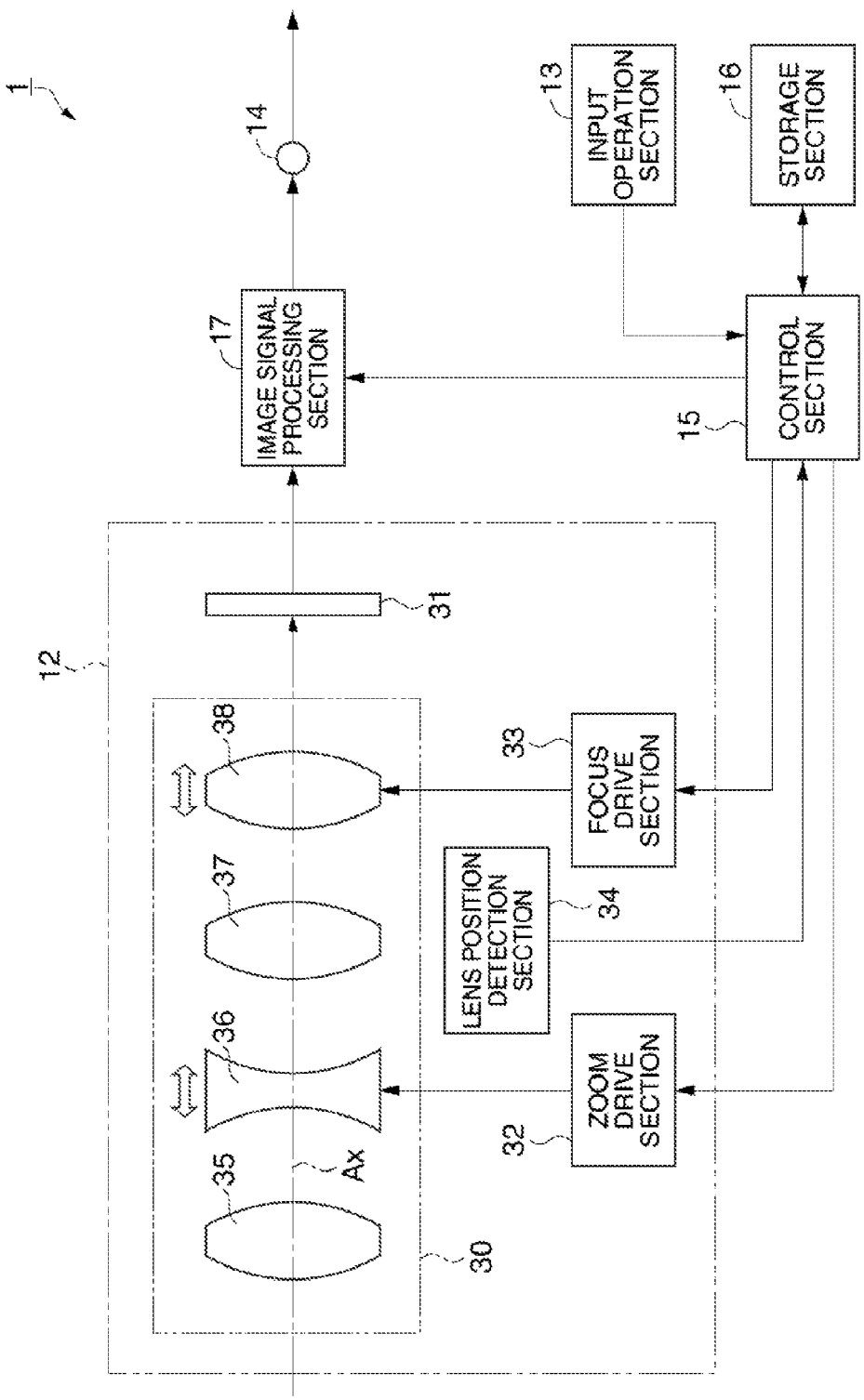
FIG. 2 is a block diagram showing a schematic configuration of the document camera.

FIG. 2 is a block diagram showing a schematic configuration of the document camera 1. As shown in FIG. 2, the document camera 1 is configured including a control section 15, a storage section 16, an image signal processing section 17, and so on in addition to the imaging section 12, the input operation section 13, and the output terminals 14, and these constituents are housed in the housing 10.

The control section 15 is composed mainly of a central processing unit (CPU), a random access memory (RAM), and so on, and operates with a control program stored in the storage section 16 to thereby perform the overall control of the document camera 1. In other words, the control section 15 functions as a computer together with the storage section 16.

The storage section 16 is composed of a non-volatile memory such as a mask read only memory (ROM) or a flash memory. The storage section 16 stores the control program for controlling the operation of the document camera 1, various setting data for defining, for example, operational conditions of the document camera 1, and so on.

The input operation section 13 is for receiving an input operation from the user, and is provided with a plurality of operation keys for providing various instructions to the document camera 1. As shown in FIG. 1A, a power key 21 for powering on and starting up the document camera 1, a pair of zoom keys 22 for controlling the magnification ratio of the imaging, a focus key 23 for automatically adjusting the focus, and so on are cited as the operation keys provided to the input operation section 13. When the user operates the various operation keys of the input operation section 13, the input operation section 13 receives the input operation, and then outputs an operation signal corresponding to the content of the operation by the user to the control section 15.

The imaging section 12 is provided with a lens unit 30, an imaging element 31, a zoom drive section 32, a focus drive section 33, and a lens position detection section 34. The lens unit 30 includes a stationary lens 35, a zoom lens 36, a stationary lens 37, and a focus lens 38, and the light reflected by the object M is imaged on a light receiving surface of the imaging element 31 passing through the lens unit 30. The imaging element 31 is formed of a charge coupled device (CCD) sensor, a complementary metal oxide semiconductor (CMOS) sensor, or the like, and receives the light input through the lens unit 30 to thereby perform imaging. On the light receiving surface of the imaging element 31, there are formed a plurality of pixels (light receiving pixels) arranged in a matrix, and the imaging section 12 generates the image signal based on the light receiving amount of each of the pixels at a predetermined frame rate, and sequentially outputs the image signal to the image signal processing section 17 via the cable (not shown) wired inside the support arm 11.

The zoom drive section 32 is configured including a stepping motor and so on, and drives the zoom lens 36 of the lens unit 30 based on the instruction of the control section 15 to thereby change the position of the zoom lens 36 in the optical axis Ax. The zoom lens 36 is for controlling the focal distance, namely the field angle of the lens unit 30, and is arranged to be able to move in a range from the wide-angle end with the shortest focal distance and the largest field angle to the telephoto end with the longest focal distance and the smallest field angle. The control section 15 makes the zoom drive section 32 drive the zoom lens 36 in accordance with the operation of the pair of zoom keys 22 provided to the input operation section 13. In other words, the user can control the field angle to a desired size by performing the operation (zoom operation) of the zoom keys 22.

The focus drive section 33 is configured including a stepping motor and so on, and drives the focus lens 38 of the lens unit 30 based on the instruction of the control section 15 to thereby change the position of the focus lens 38 in the optical axis Ax. The focus lens 38 is for adjusting the focus state (focus) of the image taken by the imaging element 31, and is arranged to be able to take a focused (focal) image by varying the position of the focus lens 38 in accordance with the distance (the subject distance) from the lens unit 30 to the object M. It should be noted that hereinafter the position of the focus lens 38 where focus is achieved is also referred to as an focal position. Further, the document camera 1 according to the present embodiment has the automatic focus function, and performs the automatic focus process for automatically adjusting the focus lens 38 to the focal position in accordance with the subject distance when the document camera 1 is started up, or when the focus key 23 of the input operation section 13 is operated (the details will be described later).

The lens position detection section 34 is formed of an encoder or the like, and detects the positions of the zoom lens 36 and the focus lens 38, and outputs the detection result to the control section 15. The control section 15 controls the operations of the zoom drive section 32 and the focus drive section 33 based on the detection result of the lens position detection section 34 to thereby control the positions of the zoom lens 36 and the focus lens 38.

The image signal processing section 17 performs the process of amplifying the image signal input from the imaging section 12 (the imaging element 31) and converting the image signal into an image signal of a predetermined format based on the instruction of the control section 15, and then outputs the image signal thus processed to an external device from the output terminals 14 via the cable not shown. Further, the image signal processing section 17 is capable of outputting the image signal based on the predetermined image data stored in the storage section 16 based on the instruction of the control section 15. In other words, the image signal processing section 17 is capable of switching between the state of outputting the image signal representing the image (the taken image) taken by the imaging section 12 and the state of outputting the image signal based on the predetermined image data in accordance with the instruction of the control section 15.

Here, in the lens unit 30 according to the present embodiment, the focal position of the focus lens 38 varies in accordance with the subject distance, and also varies in accordance with the position, namely the focal distance (field angle), of the zoom lens 36.

Figures 3, 4:
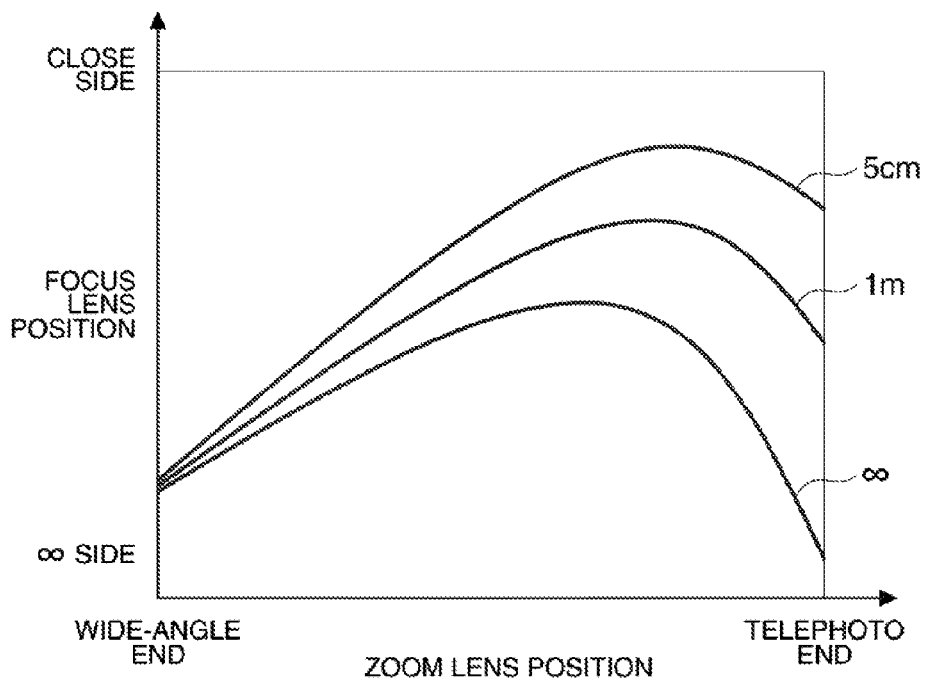
FIG. 3 is a graph showing a relationship between a position of a zoom lens and an focal position of a focus lens.
FIG. 4 is a diagram showing a data table describing the focal position corresponding to the position of the zoom lens and a subject distance.

FIG. 3 is a graph showing a relationship between the position of the zoom lens 36 and the focal position of the focus lens 38. In the present diagram, the horizontal axis represents the position of the zoom lens 36 assuming that the left side corresponds to the wide-angle end, and the right side corresponds to the telephoto end. Further, the vertical axis represents the position of the focus lens 38, and the upper the position, the more suitably the position corresponds to the close subject distance.

The three curves shown in the drawing represent the loci of the focal position in the cases of the subject distances of 5 cm, 1 m, and ∞, respectively. As described above, the focal position of the focus lens 38 draws the locus different between the subject distances, and at the same time varies in accordance with the position of the zoom lens 36. Further, although the difference in the focal position between the subject distances is small on the wide-angle side due to deep depth of field, the closer to the telephoto side, the shallower the depth of field is, and therefore, the greater the difference in the focal position between the subject distances is.

In the present embodiment, since the focal position varies in accordance with the position of the zoom lens 36 in such a manner, defocus occurs when changing the position of the zoom lens 36 even if the subject distance is constant. Therefore, the control section 15 is arranged to move the focus lens 38 with the graph shown in FIG. 3 in conjunction with the movement of the zoom lens 36 so that the zoom operation can be performed while keeping the focal state.

FIG. 4 is a diagram showing a data table showing the focal position corresponding to the position of the zoom lens 36 and the subject distance, and the document camera 1 keeps the data table in the storage section 16.

As shown in FIG. 4, the data table TB is a table for obtaining the focal position of the focus lens 38 based on the position Z of the zoom lens 36 and the subject distance D, and is generated based on the graph shown in FIG. 3. Here, the numerical value representing the position Z of the zoom lens 36 represents the magnification ratio of the image corresponding to the focal distance (the field angle), and the data table TB includes the data corresponding to the wide-angle end of 1× to the telephoto end of 12×. Further, the subject distance D is defined by dividing a focal range from infinity (∞) to the closest point (5 cm) into a plurality of sections, and the data table TB includes the data corresponding to the respective sections.

The control section 15 is arranged to keep the focal state by moving the focus lens 38 with the data table TB in accordance with the position of the zoom lens 36. For example, in the case in which the subject distance is infinity, and the position of the zoom lens 36 is varied from the wide-angle end to the telephoto end, the control section 15 changes the position of the focus lens 38 to a1, a2, . . . , a12 in accordance with the position of the zoom lens 36 in order to keep the focal state. Similarly, in the case in which the subject distance is the closest point (5 cm), and the position of the zoom lens 36 is varied from the wide-angle end to the telephoto end, the control section 15 changes the position of the focus lens 38 to e1, e2, . . . , e12 in accordance with the position of the zoom lens 36 in order to keep the focal state.

It should be noted that since the depth of field is deep in the wide-angle end but is shallow in the telephoto end, even if the position of the focus lens 38 is adjusted with the data table TB, there can occur the case in which defocus becomes conspicuous as the position is changed toward the telephoto side although it appears that the focus is achieved in the wide-angle end. Therefore, in the automatic focus process performed at startup or in response to the operation of the focus key 23, the document camera 1 according to the present embodiment is arranged to detect the focal position after temporarily moving the zoom lens 36 to the telephoto end with shallow depth of field, and then restore the position of the zoom lens 36 to the original position.

Figure 5:
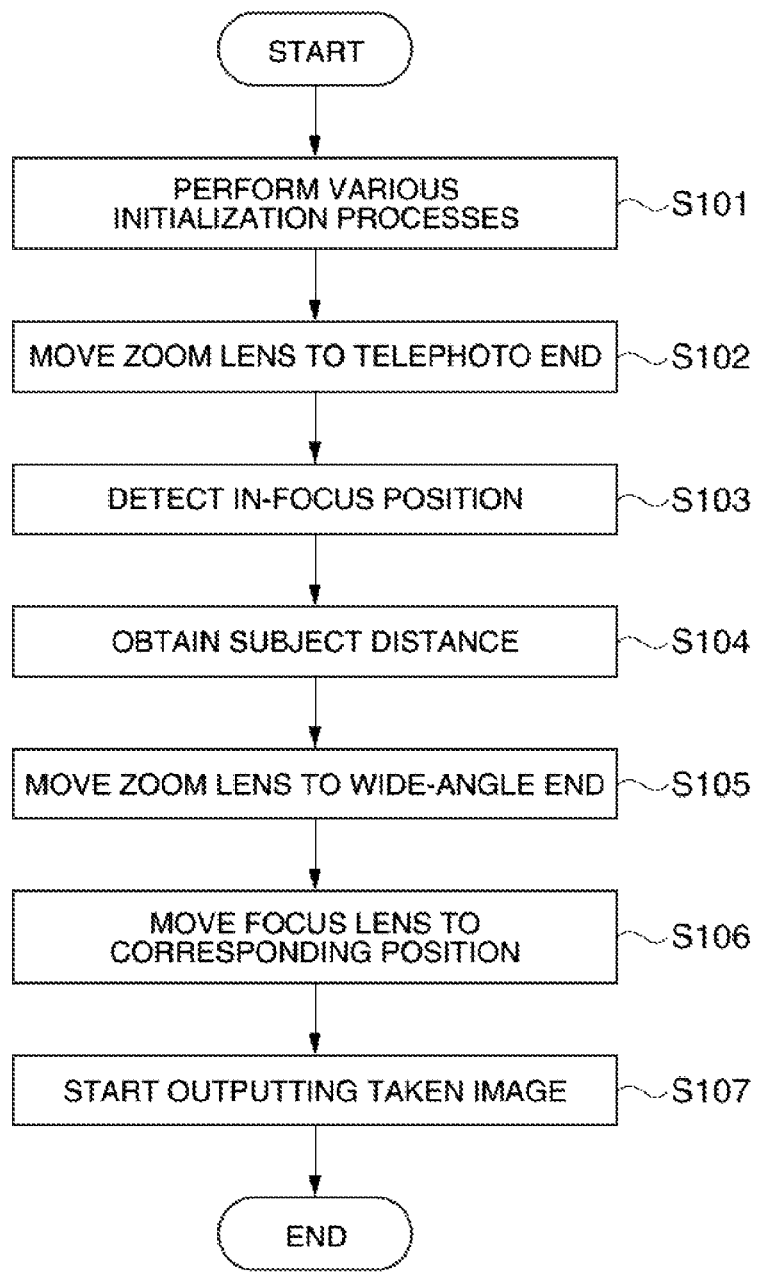
FIG. 5 is a flowchart for explaining a start-up operation of the document camera.

FIG. 5 is a flowchart for explaining a start-up operation of the document camera 1. When the commercial power is input to the document camera 1, the control section 15 starts the operation with the control program. Immediately after the commercial power is input, the document camera 1 is in the standby state (the power-OFF state), and stands ready for the operation of the power key 21 of the input operation section 13 by the user. Then, when the user operates the power key 21, the document camera 1 operates with the flowchart shown in FIG. 5. It should be noted that it is assumed that the user operates the power key 21 in the state in which the object M is placed within the imaging range of the imaging section 12.

As shown in FIG. 5, in the step S101, the control section 15 performs various initialization processes. For example, the control section 15 performs a process of moving the zoom lens 36 and the focus lens 38 to predetermined positions (initial positions), a process of outputting the image information of a predetermined image (an initial image) from the image signal processing section 17 instead of the taken image until the imaging section 12 becomes ready, and so on.

In the step S102, the control section 15 instructs the zoom drive section 32 to move the zoom lens to the telephoto end (the position where the magnification ratio is 12×), namely the position where the focal distance is the longest and the field angle is the smallest in the movable range of the zoom lens 36.

In the step S103, the control section 15 detects the focal position based on the image obtained by imaging the object M. Specifically, the control section 15 obtains the contrast of the image taken by the imaging element 31 while instructing the focus drive section 33 to gradually change the position of the focus lens 38, and then determines the position with the highest contrast as the focal position. It should be noted that since it takes long time to perform the process if adopting a method of sequentially changing the position of the focus lens 38 from either one of the ends to the other when gradually changing the position of the focus lens 38, it is desirable to detect the position with the highest contrast while changing the position of the focus lens 38 from the present position toward either of the directions. In this case, if the contrast at the position slightly shifted toward either one of the directions is lower than the contrast at the present position, it is possible to detect the position with the highest contrast while moving the position in the opposite direction. Further, if the contrast is also lowered at the position slightly shifted toward the opposite direction, it is also possible to terminate the process at that time point determining that the present position is the focal position.

In the step S104, the control section 15 refers to the data table TB shown in FIG. 4 to thereby obtain the subject distance based on the focal position detected. Specifically, since the position of the zoom lens 36 is in the telephoto end (the position of 12×), the control section 15 identifies the value close to the focal position thus detected out of the focal positions (a12 through e12) corresponding to the telephoto end, and then obtains the subject distance based on the focal position thus identified. For example, if the focal position thus detected is close to d12, the subject distance is determined to be roughly 30 cm.

In the step S105, the control section 15 instructs the zoom drive section 32 to move the zoom lens to the wide-angle end (the position where the magnification ratio is 1×), namely the position where the focal distance is the shortest and the field angle is the largest in the movable range of the zoom lens 36.

In the step S106, the control section 15 refers to the data table TB shown in FIG. 4 to thereby obtain the position of the focus lens 38 corresponding to the subject distance obtained in the step S104 and the present position (the wide-angle end) of the zoom lens 36. Then, the control section 15 instructs the focus drive section to move the focus lens 38 to that position. For example, if the subject distance thus obtained is 30 cm, the control section 15 moves the focus lens 38 to d1 corresponding to the wide-angle end. Thus, the lens unit 30 is set to the state in which the object M is focused on in the wide-angle end, and imaging by the imaging section 12 turns to be ready.

In the step S107, the control section 15 instructs the image signal processing section 17 to start outputting the taken image (the image information) instead of the initial image, and then terminates the flow. As a result, the image information of the image with the object M focused on in the wide-angle end is output from the output terminals 14.

As described above, the document camera 1 detects the focal position in the state in which the zoom lens 36 is moved to the telephoto end with shallow depth of field at startup, and then moves the zoom lens 36 to the wide-angle end. Therefore, even if the user subsequently operates the zoom keys 22 to move the zoom lens 36 from the wide-angle end toward the telephoto end, it is possible to keep the focal state. It should be noted that in the flowchart shown in FIG. 5, the steps S102 through S106 correspond to the automatic focus process. Here, the reason that the zoom lens 36 is moved to the wide-angle end in the step S105 is that by keeping the state of imaging a broader range (e.g., the whole of the object M) immediately after startup, the convenience for the user to subsequently select the imaging range (the range to be magnified) is enhanced.

Figure 6:
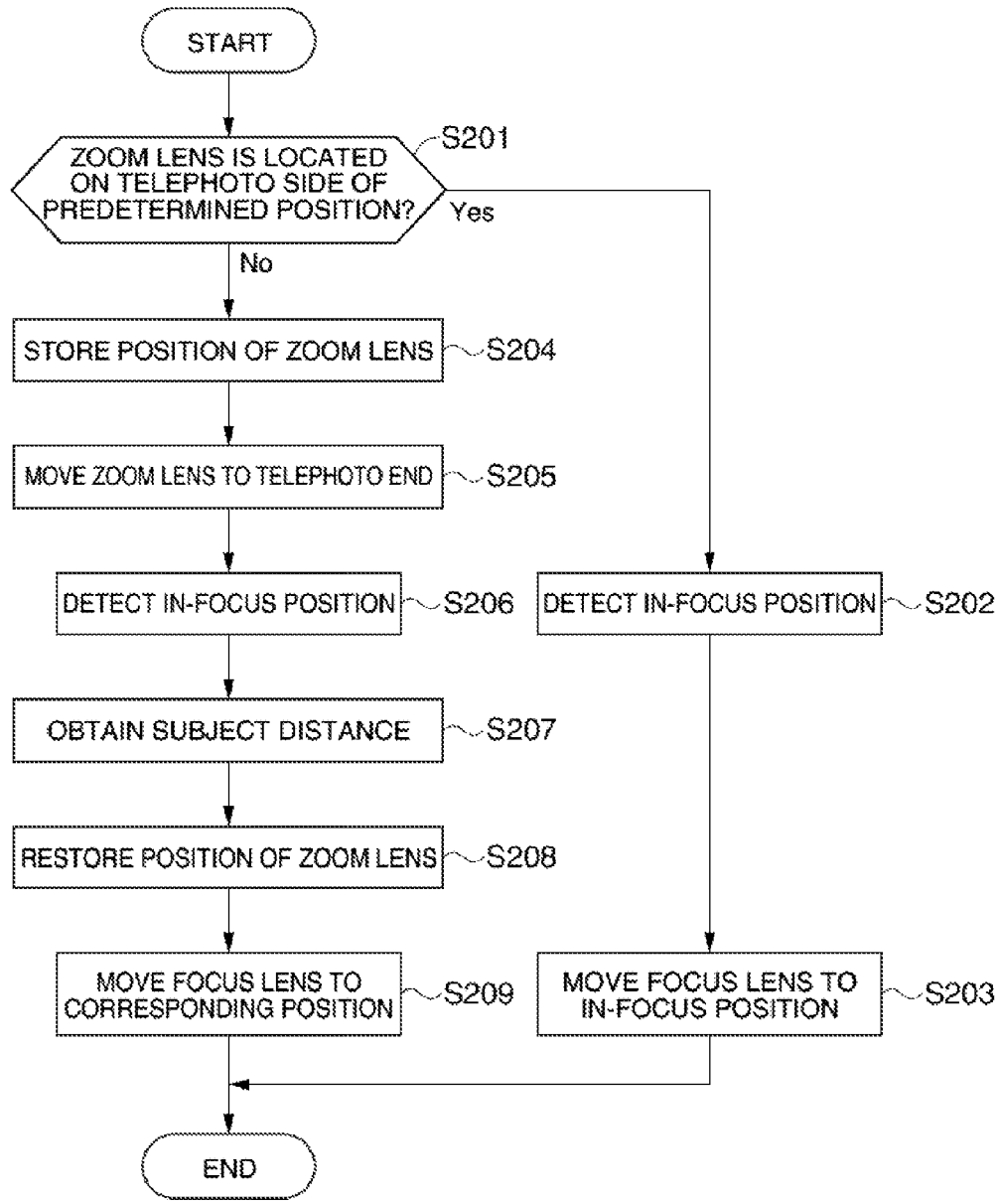
FIG. 6 is a flowchart for explaining an operation of the document camera when a focus key is operated.

FIG. 6 is a flowchart for explaining the operation of the document camera 1 when the focus key 23 is operated, and shows the automatic focus process performed when the focus key 23 is operated. When the user operates the focus key 23 in the power-ON state, the document camera 1 operates with the flowchart shown in FIG. 6.

As shown in FIG. 6, in the step S201, the control section 15 detects the present position of the zoom lens 36 based on the detection result of the lens position detection section 34 to thereby determine whether or not the zoom lens 36 is located on the telephoto side of a predetermined position. Then, if the zoom lens 36 is located on the telephoto side of the predetermined position, the process proceeds to the step S202, or if it is not located on the telephoto side of the predetermined position, namely if it is located at the predetermined position or on the wide-angle side of the predetermined position, the process proceeds to the step S204.

If the zoom lens 36 is located on the telephoto side of the predetermined position, and the process proceeds to the step S202, the control section 15 performs the same operation as in the step S103 to thereby detect the focal position. Further, in the step S203, the control section 15 instructs the focus drive section 33 to move the focus lens 38 to the focal position thus detected, and then terminates the flow. As described above, in the case in which the zoom lens 36 is located on the telephoto side of the predetermined position, the depth of field is shallow, and defocus is inconspicuous even if the zoom operation is subsequently performed, and therefore, the focal position is detected without changing the position of the zoom lens 36.

In contrast, if the zoom lens 36 is not located on the telephoto side of the predetermined position, and the process proceeds to the step S204, the control section 15 stores the present position of the zoom lens 36 in its own RAM.

The steps S205 through S207 are the same as the steps S102 through S104 described above. Specifically, in the step S205, the control section 15 instructs the zoom drive section 32 to move the zoom lens 36 to the telephoto end, and in the step S206, the control section 15 detects the focal position. Further, in the step S207, the control section 15 refers to the data table TB shown in FIG. 4 to thereby obtain the subject distance based on the focal position detected.

In the step S208, the control section 15 restores the position of the zoom lens 36 at the time point when the focus key 23 is operated. Specifically, the control section 15 reads out the position of the zoom lens 36 stored in the RAM in the step S204, and then instructs the zoom drive section 32 to move the zoom lens 36 from the telephoto end to that position.

In the step S209, the control section 15 refers to the data table TB shown in FIG. 4 to thereby obtain the position of the focus lens 38 corresponding to the subject distance obtained in the step S207 and the present position of the zoom lens 36. Then, the control section 15 instructs the focus drive section 33 to move the focus lens 38 to that position, and then terminates the flow. As a result, the image information of the image with the object M focused on is output from the output terminals 14.

As described above, if the focus key 23 is operated in the state in which the zoom lens 36 is not located on the telephoto side of the predetermined position, the document camera 1 detects the focal position in the state in which the zoom lens 36 is moved to the telephoto end with shallow depth of field, and then moves the zoom lens 36 to the original position. Therefore, even if the user subsequently operates the zoom keys 22 to move the zoom lens 36, it is possible to keep the focal state.

As explained hereinabove, according to the document camera 1 of the present embodiment, the following advantages can be obtained.

1. According to the document camera 1 of the present embodiment, the focal position is detected in the state in which the position of the zoom lens 36 is positioned at the telephoto end, and then the zoom lens 36 is moved to the original position (a reference position) after the detection. Therefore, since the focal position is detected at the position with the shallowest depth of field, it becomes possible to detect the focal position more accurately than in the case of detecting the focal position at the reference position. As a result, even if the zoom operation is subsequently performed, there is no need to readjust the focal position.

2. According to the document camera 1 of the present embodiment, since the automatic focus process is performed at startup, it becomes unnecessary to separately perform the process for focusing after startup, and the convenience is enhanced.

3. According to the document camera 1 of the present embodiment, since the automatic focus process is performed at startup and then the zoom lens 36 is moved to the wide-angle end to image a broad range, the convenience of subsequently selecting the imaging range (the range to be magnified) is enhanced.

4. According to the document camera 1 of the present embodiment, if the focus key 23 is operated, the zoom lens 36 is moved to the telephoto end to detect the focal position, and then the zoom lens 36 is moved to the position at the time point when the focus key 23 is operated. Therefore, the zoom state (the focal distance) can be prevented from changing between before and after the automatic focus process.

5. According to the document camera 1 of the present embodiment, in the automatic focus process in response to the operation of the focus key 23, if the position of the zoom lens 36 is on the telephoto side of the predetermined position, the focal position is detected without changing the position of the zoom lens 36. Therefore, it becomes possible to reduce the time necessary to detect the focal position.

It should be noted that in the present embodiment the control section 15 corresponds to a focus control section. Further, the power key 21 of the input operation section 13 corresponds to a start-up operation section, and the focus key 23 of the input operation section 13 corresponds to a focus operation section. Further, in the automatic focus process performed at startup, the wide-angle end corresponds to the reference position (the position to which the zoom lens 36 should be moved after detecting the focal position), and in the automatic focus process performed in the case in which the focus key 23 is operated, the position of the zoom lens 36 at the time point when the focus key 23 is operated corresponds to the reference position.

Modified Example

Further, the embodiment described above can also be modified as follows.

In the embodiment described above, in order to reduce the time necessary for the automatic focus process, it is also possible to limit the movable range of the focus lens 38 in the automatic focus process to a frequently-used range. Further, it is also possible to adopt a method of manually adjusting the focus if the actual focal position exists outside the movable range. Further, it is also possible to detect the rotational state of the main body 12a with respect to the base end section 12b of the imaging section 12, and switch the movable range in accordance with the rotational state. For example, it is possible to set the close side (e.g., 5 cm through 30 cm) to the movable range if the lens unit 30 is tilted downward, or set the infinity (∞) side (e.g., 1 m through ∞) to the movable range if the lens unit 30 is horizontal.

Although in the embodiment described above the automatic focus process is performed using the contrast detection method of determining the position with the highest contrast as the focal position, the method of the automatic focus process is not limited to the contrast detection method, but other methods can be adopted providing the methods are for determining the focal state based on the image taken by the imaging element 31.

Although in the embodiment described above, the automatic focus process is performed in the telephoto end, the position of the zoom lens 36 when the automatic focus process is performed is not limited to the telephoto end. It should be noted that since it is required to perform the automatic focus process at the position with shallow depth of field, the vicinity of the telephoto end is desirable. Further, it is also possible to arrange that the position of the zoom lens 36 when performing the automatic focus process is determined in accordance with the depth of field. For example, it is possible to perform the automatic focus process at the position where the depth of field is equal to or shallower than 10 mm, or it is also possible to arrange that the automatic focus process is performed at the position where the depth of field is equal to or shallower than 5 mm in order to further suppress the defocus.

In the embodiment described above, it is also possible to arrange that the image information of the taken image is output from the output terminals 14 during the automatic focus process, or that the image information of another image (e.g., the initial image) is output.

The entire disclosure of Japanese Patent Application No. 2012-069216, filed Mar. 26, 2012 is expressly incorporated by reference herein.

What is claimed is:

1. An imaging device comprising:
   a lens unit including a zoom lens and a focus lens;
   an imaging element adapted to receive light from a subject at a subject distance from the lens unit input through the lens unit to perform imaging;
   a zoom drive section adapted to move the zoom lens in an optical axis direction to vary a focal distance;
   a focus drive section adapted to move the focus lens in the optical axis direction to vary a focus state;
   a focus control section adapted to make the imaging element perform imaging while making the focus drive section change a position of the focus lens to detect a focal position based on an imaging result of the imaging element, and perform focusing based on the focal position detected; and
   a storage section that stores a plurality of focal positions each corresponding to a subject distance and a zoom lens position,
   wherein the focus control section detects the focal position and obtains the subject distance corresponding to the detected focal position and current zoom lens position from the storage section, in a state in which the zoom lens is positioned on a telephoto side of a predetermined reference position using the zoom drive section, and then moves the zoom lens to the predetermined reference position after the detection, and adjusts the focal position of the focus lens to a focal position, which is obtained from the storage section, that corresponds to the obtained subject distance and the predetermined reference position of the zoom lens.

2. The imaging device according to claim 1, wherein the focus control section detects the focal position in a state in which the zoom lens is positioned at a telephoto end using the zoom drive section.

3. The imaging device according to claim 1, further comprising:
   a start-up operation section adapted to receive an operation of instructing startup of the imaging device,
   wherein the focus control section detects the focal position to perform focusing if the start-up operation section receives the operation.

4. The imaging device according to claim 3, wherein the predetermined reference position is a wide-angle end.

5. The imaging device according to claim 1, wherein the focus control section detects the focal position while changing the position of the focus lens within a range smaller than a movable range of the focus lens.

6. The imaging device according to claim 1, further comprising:
   a focus operation section adapted to receive an operation of instructing focusing,
   wherein the focus control section detects the focal position to perform focusing if the focus operation section receives the operation, and the predetermined reference position corresponds to the position of the zoom lens at a time point when the focus operation section receives the operation.

7. The imaging device according to claim 6, further comprising:
   a lens position detection section adapted to detect a position of the zoom lens,
   wherein the focus control section detects the focal position without changing the position of the zoom lens if the position of the zoom lens detected by the lens position detection section is on the telephoto side of the predetermined reference position.

8. The imaging device according to claim 1, wherein if the zoom lens is located on the telephoto side of the predetermined reference position, the focus control section detects the focal position and moves the focus lens to the focal position.

9. A method of controlling an imaging device including a lens unit including a zoom lens and a focus lens,
   an imaging element adapted to receive light from a subject at a subject distance from the lens unit input through the lens unit to perform imaging,
   a zoom drive section adapted to move the zoom lens in an optical axis direction to vary a focal distance, and
   a focus drive section adapted to move the focus lens in the optical axis direction to vary a focus state,
   a focus control section adapted to make the imaging element perform imaging while making the focus drive section change a position of the focus lens to detect a focal position based on an imaging result of the imaging element, and perform focusing based on the focal position detected; and
   a storage section that stores a plurality of focal positions each corresponding to a subject distance and a zoom lens position, the method comprising:
   a zoom position changing step of positioning the zoom lens by the zoom drive section on a telephoto side of a predetermined reference position;
   a focal position detecting step of making the imaging element perform imaging while changing a position of the focus lens by the focus drive section, and detecting a focal position based on an imaging result of the imaging element after the zoom position changing step;
   a subject distance obtaining step of obtaining the subject distance corresponding to the detected focal position and current zoom lens position from the storage section;
   a zoom position restoring step of moving the zoom lens to the predetermined reference position by the zoom drive section after the focus position detecting step; and
   a focusing step of adjusting the focal position of the focus lens to the focal position, which is obtained from the storage section, that corresponds to the obtained subject distance and the predetermined reference position of the zoom lens.

10. The method of controlling an imaging device according to claim 9, wherein
   in the zoom position changing step, the zoom lens is positioned at the telephoto end.

11. The method of controlling an imaging device according to claim 9, further comprising:
   a startup operation step of receiving an operation of instructing startup of the imaging device,
   wherein the zoom position changing step, the focus position detecting step, the zoom position restoring step and the focusing step are performed subsequently to the startup operation step.

12. The method of controlling an imaging device according to claim 11, wherein
the predetermined reference position is a wide-angle end.

13. The method of controlling an imaging device according to claim 9, wherein
in the focus position detecting step, the focal position is detected while changing the position of the focus lens within a range smaller than a movable range of the focus lens.

14. The method of controlling an imaging device according to claim 9, further comprising:
a focusing operation step of receiving an operation of instructing focusing,
wherein the zoom position changing step, the focus position detecting step, the zoom position restoring step and the focusing step are performed after the focusing operation step, and
the predetermined reference position corresponds to the position of the zoom lens at a time point when the operation is received in the focusing operation step.

15. The method of controlling an imaging device according to claim 14, further comprising:
a lens position detecting step of detecting a position of the zoom lens,
wherein in the focus position detecting step, the focal position is detected without changing the position of the zoom lens if the position of the zoom lens detected in the lens position detecting step is on the telephoto side of the predetermined reference position.

* * * * *